Aug. 26, 1941. W. O. LYTLE 2,254,044
BUILDING CONSTRUCTION
Filed Aug. 4, 1938 5 Sheets-Sheet 1
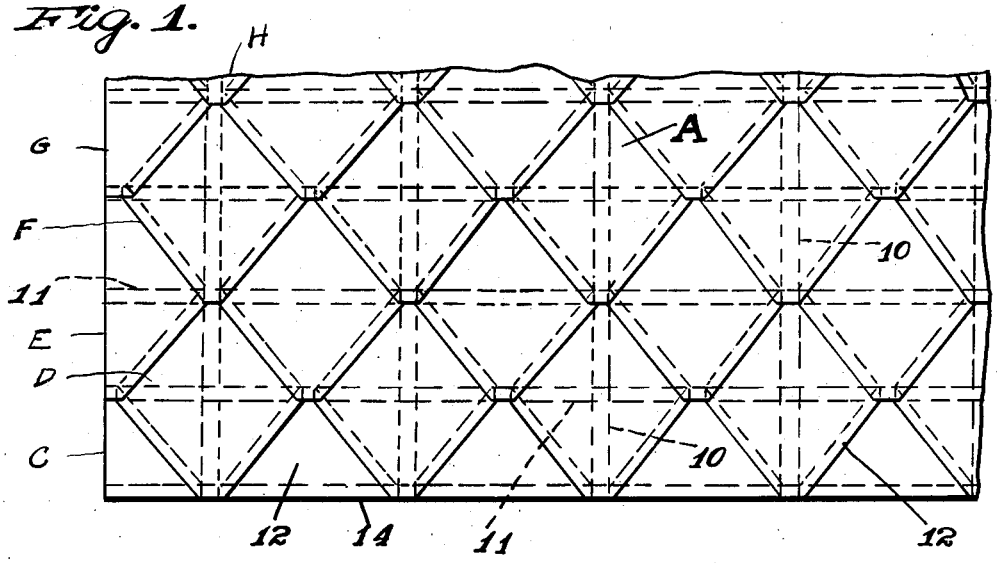
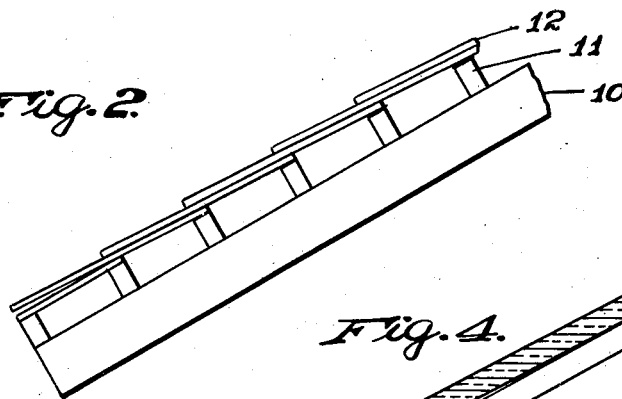
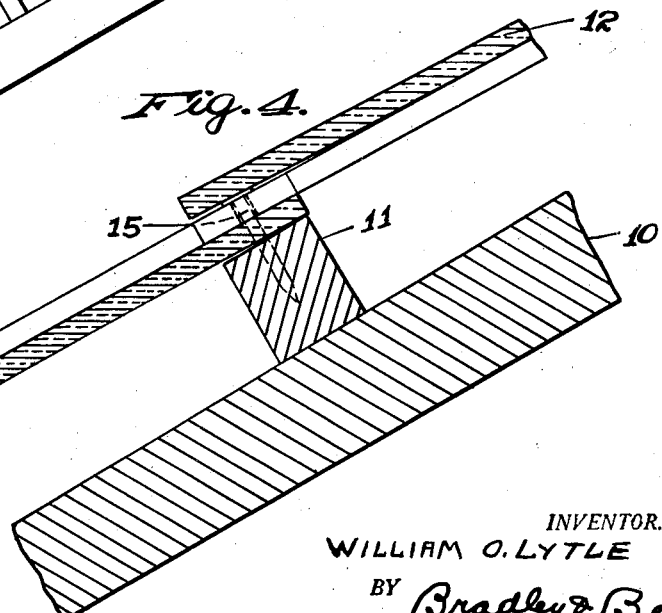
INVENTOR.
WILLIAM O. LYTLE
BY Bradley & Bee
ATTORNEYS.

Aug. 26, 1941.　　　W. O. LYTLE　　　2,254,044
BUILDING CONSTRUCTION
Filed Aug. 4, 1938　　　5 Sheets-Sheet 2

INVENTOR.
WILLIAM O. LYTLE
BY Bradley & Bee
ATTORNEYS.

Aug. 26, 1941.  W. O. LYTLE  2,254,044
BUILDING CONSTRUCTION
Filed Aug. 4, 1938  5 Sheets-Sheet 3

INVENTOR.
WILLIAM O. LYTLE
BY Bradley & Bee
ATTORNEYS.

Aug. 26, 1941.     W. O. LYTLE     2,254,044
BUILDING CONSTRUCTION
Filed Aug. 4, 1938     5 Sheets-Sheet 4

INVENTOR.
WILLIAM O. LYTLE
BY Bradley & Bee
ATTORNEYS.

Aug. 26, 1941.  W. O. LYTLE  2,254,044
BUILDING CONSTRUCTION
Filed Aug. 4, 1938  5 Sheets-Sheet 5
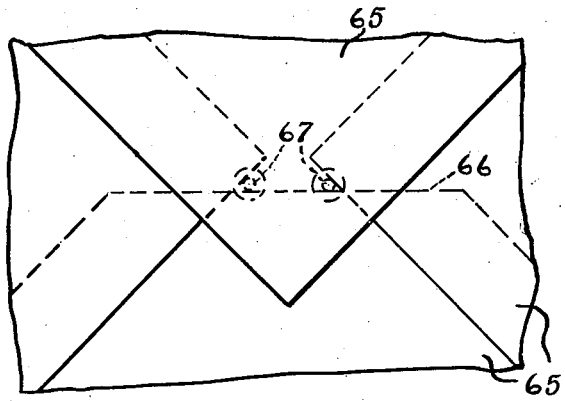
Fig. 11.
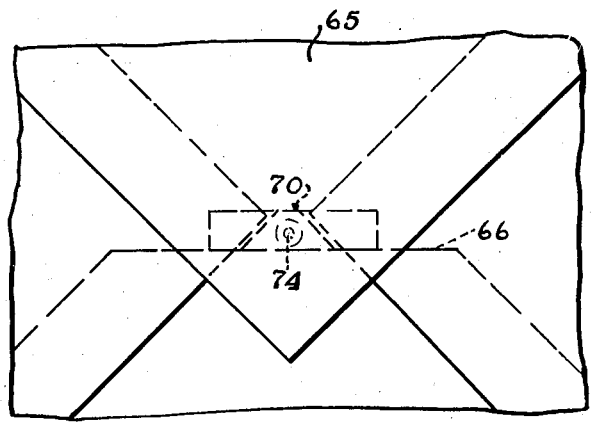
Fig. 12.
Fig. 13.
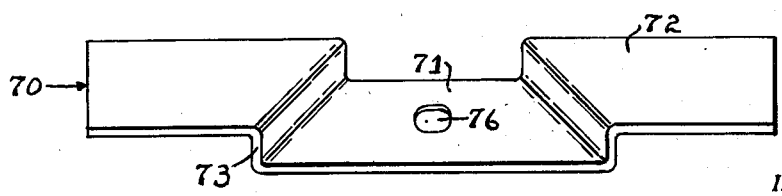
INVENTOR.
WILLIAM O. LYTLE
BY Bradley & Bee
ATTORNEYS.

Patented Aug. 26, 1941

2,254,044

UNITED STATES PATENT OFFICE 2,254,044

BUILDING CONSTRUCTION

William O. Lytle, New Kensington, Pa., assignor to Pittsburgh Plate Glass Company, Allegheny County, Pa., a corporation of Pennsylvania Application August 4, 1938, Serial No. 223,049

5 Claims. (Cl. 108—10)

The present invention relates to protective coverings for roofs or walls of buildings and it has particular relation to coverings comprising plates of glass arranged in overlapping relation to provide a shingle-like outer covering.

One object of the invention is to provide a covering of overlapping shingle-like glass plates in which the plates are highly resistant to breakage due to stresses created by unequal heating of exposed and unexposed parts or to strains created by freezing of moisture between units, and in which if breakage does occur, repair is simple.

A second object of the invention is to provide a construction of the foregoing type in which a minimum of glass is required to cover a given area.

These and other objects will be apparent from consideration of the following specification and the appended claims.

Among the materials employed in fabricating roofs, and sometimes the sidewalls of buildings, are included shingles of wood, or of felt-like material saturated with asphalt. These materials, of course, are of relatively low resistance to weathering and unless they are kept painted, the life thereof is comparatively short. Accordingly, they are not usually employed in the better types of construction. Slate and tiles have long enjoyed wide use as sheathing elements in roofs and similar structures where higher resistance to weathering is required. However, such materials are highly frangible and breakage due either to thermal or mechanical stresses is frequent. Moreover, tiles and slate are also of a porous nature and the permeation of water into such structures followed by a freezing results in gradual disintegration. Such materials, of course, are quite opaque and cannot be employed where transparency or light transmission is desired.

Plates or units of these various materials are arranged in overlapping courses and rows that provide definite decorative patterns. Although the materials from which the units are formed are by no means satisfactory, the public has long been accustomed to the patterns provided and other forms are not satisfying to the esthetic senses.

Common glass has certain properties such as great resistance to permeation by water, resistance to weathering and a high degree of transparency or translucency which would render it valuable as an external sheathing or covering material for both the roofs and the sidewalls of many buildings where admission of light or the provision of decorative color effects is desired. However, common annealed glass is of such brittle or frangible nature that mechanical breakage is likely to occur. Moreover, where units of glass overlap each other, unequal heating occurs and breakage as a result of thermal strain is likely to occur. Breakage as a result of freezing and expansion of moisture entering by capillary attraction, condensation or otherwise may also occur. For these reasons, it will be apparent that danger from falling glass to occupants of the building is substantial unless a backing of wood or some similar material is provided. Such backing in addition to being expensive, prevents the transmission of light through a wall or roof and would, therefore, defeat one of the primary objects of employing glass shingles or plates.

A further serious objection to the use of plates or sheets of glass as shingles or units in a roof has consisted in the fact that when a unit was cracked or broken the pieces usually remained in place and could not be detected. Leakage might occur as a result of such broken units and it would be difficult to determine the origin. Removal of the stub of the broken shingle from beneath the overlapping shingle might be difficult and might be attended by breakage of adjacent units. Since, as a result of various types of breakage about 25 per cent of the units comprising an ordinary shingle type glass roof might be expected to break in normal service over a period of time, such replacements would be relatively frequent and the labor involved and the expense entailed would become considerable. For the foregoing reasons, glass has not heretofore enjoyed any substantial use as a roofing or wall material except in the form of easily replaced panes, enclosed in reinforcing sashes such as are employed in the fabrication of window, skylights, greenhouses and so forth. When the glass is supported in frames, it is uniformly exposed to radiation throughout its area so that there is no differential of thermal expansion with the result of breakage. Also, no opportunity is afforded for water to seep between two superposed units to freeze and cause breakage. Moreover, a broken pane is always completely accessible and can easily be detected and removed from its frame and replaced by a simple glazing operation without danger of breakage of additional units.

Of course, the sashes did not represent the conventional shingle pattern to which the public has so long been accustomed and therefore appeared unconventional and unsightly, particularly in residential buildings. The sash frames were subjected to rust or decay and painting thereof in order to obviate such tendencies was a relatively difficult operation and required considerable care to prevent accidental breakage of the panes by the workmen performing the operation.

The present invention is designed to obviate the foregoing difficulties by the provision of a building in which the roof or sidewalls thereof are composed of a shingle-like system of plates of tempered glass arranged diagonally with respect to the supporting purlins, to provide a highly decorative shingle finish. By such construction danger of breakage due to unequal heating of exposed and unexposed portions of the units or the action of ice is greatly reduced, and if it occurs broken units may easily be replaced.

For a better understanding of the invention, reference may now be had to the accompanying drawings in which like numerals refer to like parts throughout and in which Fig. 1 is a plan view of a portion of a roof which is constructed in accordance with the provisions of the present invention.

Fig. 2 is an end elevational view of the roof structure shown in Fig. 1.

Fig. 4 is a fragmentary cross-sectional view upon the line IV—IV of Fig. 3.

Figs. 7, 9, 11 and 12 are fragmentary plan views of a portion of a roof in which the units are secured by a further form of securing device.

Fig. 13 is an isometric detail view of the clamping device employed in the construction shown in Fig. 12.

In the form of the invention shown in Fig. 1, a system of rafters 10, which may be of conventional design, is provided with a series of transverse equally spaced purlins 11. These rafters and purlins may be of wood, metal or any other desired material.

Figure 3:
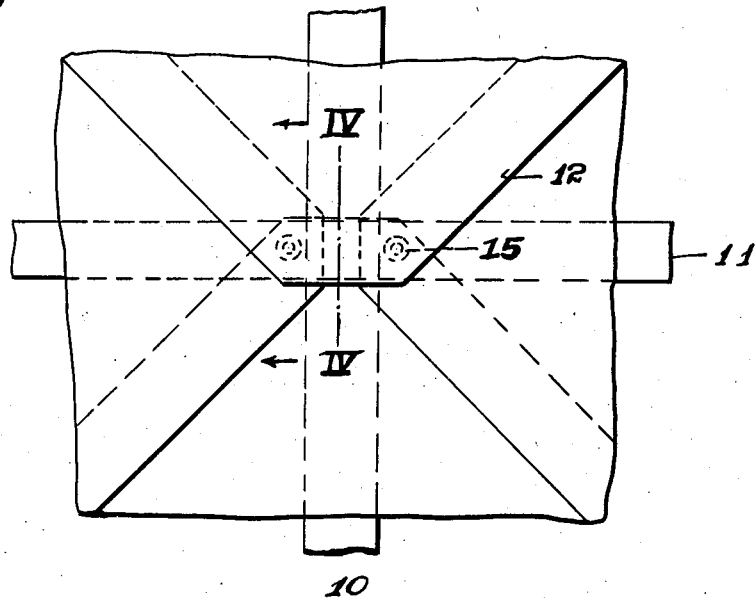
Fig. 3 is a fragmentary plan view showing on a larger scale the manner in which the various plates or shingle units overlap each other at their corners and the manner in which they are secured to the supporting roof.

The roofing elements preferably comprised plates of glass so tempered that upon rupture of the surface thereof they will be shattered automatically into small relatively rounded or diced fragments of a size corresponding approximately to that of peas. The thickness of these plates may be about ¼ inch, though greater or lesser thicknesses of glass may be employed if desired. In outline they are approximately of diamond shape, i. e. they have their diagonals disposed approximately at right angles with respect to each other. Units which have perpendicular adjacent sides are particularly satisfactory because of ease in the manufacture thereof. The plates may be formed by drawing or casting a relatively large sheet of suitable thickness and then subjecting it to annealing in conventional manner in order to relieve the internal strains or stresses therein. The sheets, after proper annealing and cooling, are cut into plates of suitable size, e. g., to a size in which one diagonal is about 18 to 36 inches. Larger or smaller units may be prepared if desired. As shown in Fig. 3 of the drawings, the corners may be cut or clipped as indicated at 13, though this is not in all cases required. Two opposed corners may be clipped, but in the form shown the four corners may be cut off. In a sense, after the removal of the corner portions, the plates constitute hexagons or octagons. Any holes required for reception of fastening devices are also formed in the annealed plates.

After the plates have been properly formed, they are then placed in a furnace and reheated to a temperature of about 1100° or 1200° F., e. g. 1150° F. and then suddenly cooled by plunging into a bath of oil or by subjection to a blast of air in order to temper them. The specific mode of tempering does not constitute a portion of the present invention and need not be described in detail.

In laying the units upon a roof or similar structure, courses C, D, E, F, G, H, etc. are formed. The bottom row or course is formed of half shingles or plates, i. e. plates which have been divided along a diagonal in order to provide triangular sections. The edge, 14, along which these shingles are cut constitutes the lower edge of the roof. Subsequently, a course of whole shingles, 11, are disposed in position with one diagonal thereof coinciding with an intermediate purlin. The lower edges of these shingles or plates overlie the upper edges of the first mentioned shingles and the lower corners thereof coincide with the adjoining corners of the latter. The intermediate or horizontally aligning corners of the whole shingles coincide with the upper corners of the half shingles. Subsequently further courses are superposed in the same way to provide a complete roof or wall structure. As shown in Fig. 1 the lower corner of a shingle will be superposed upon the upper corner of the corresponding shingle in the second course below. For example, the lower corners of the shingles in course F will rest upon the upper corners of those in course D.

Various types of fastening devices may be employed in securing the roof panels or plates in position. In the form illustrated in Figures 3 and 4, simple nails, bolts or screws 15, which may have their heads covered by overlapping portions of the adjacent shingles, or if preferred may be exposed, are employed. For reception of these nails, bolts, or screws, a suitable hole is formed in each transverse corner of the plate, and two holes mating with the first mentioned holes are formed in each upper corner. No holes are required in the lower corners. It is important to note that the diameter of these holes must be at least equal to the thickness of the plate. Holes larger of diameter may be employed if desired. If this rule is not observed the plates are likely to be unstable and to shatter automatically either in forming or during service. From Figure 4 it will be apparent that the nails extend through the lateral corners, and the upper corners of each plate, but in turn are overlaid by the lower corner on the superposed plate in such manner that the heads thereof are completely protected against the entrance of water. It will be apparent that wires may be substituted for nails or screws, and secured to the purlins by simple wrapping or tying.

Figure 5:
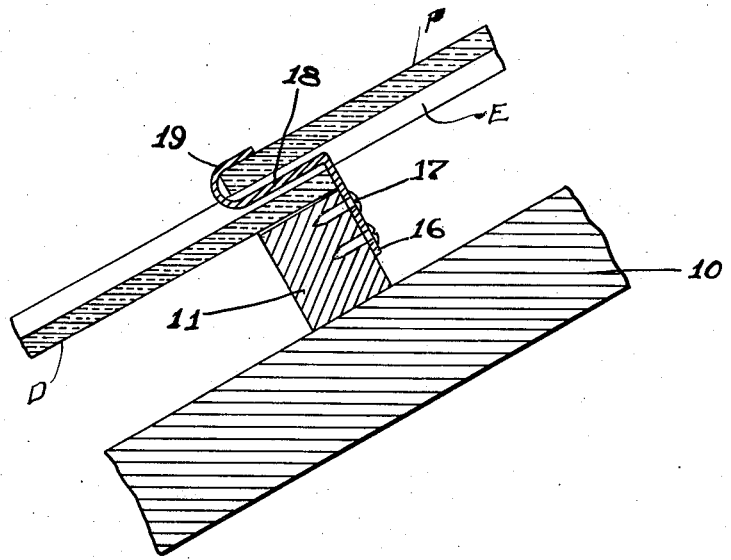
Fig. 5 is a fragmentary cross-sectional view showing a device for securing the units to the supporting framework.

A further form of fastening device which may be employed in practicing the invention is disclosed in Figure 5. In this embodiment of the invention, a strap of brass, bronze, iron or other suitable material 16, preferably of L-shape, is secured to the upper face of the purlin 11, by means of screws or nails 17. The tip of the branch 18, of this member, is upwardly and backwardly bent to provide a hook 19, which grips the lower corner of the overlying shingle unit. Of course, the upper corner of the corresponding unit in the preceding course is clamped beneath the branch 18, in such manner that the shingle units are positively secured at both their lower and their upper corners. The nails, screws or bolts may be replaced by wires which are suitably twisted around the purlins or rafters.

Figure 6:
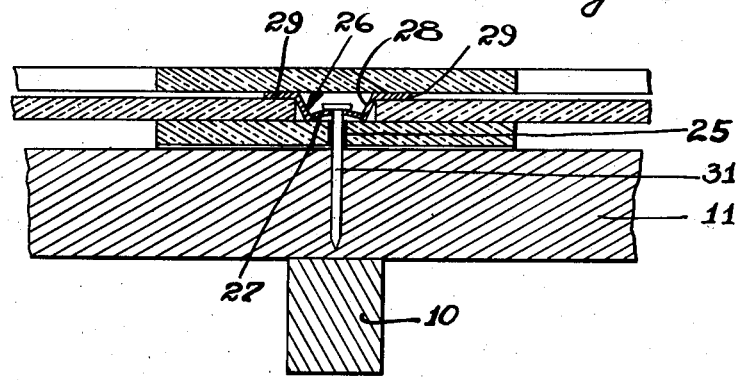
Fig. 6 is a fragmentary cross-sectional view showing a further form of device for securing these shingle units to the roof.

In the form of the invention illustrated in Figure 6, the form of the rafters and purlin is the same as already described. The arrangement of the shingle unit is likewise the same. For purposes of securing the unit in place, a hole 25 is formed in the upper corner of the lowermost shingle. The transverse corners of the units in the adjacent vertical rows are held in position by means of a clamp 26, preferably comprising a strap or strip of metal of somewhat resilient character. This strip is upwardly bowed as indicated at 27, in order to impart a certain degree of spring or elasticity thereto. The portion 28, of the strip adjacent to the intermediate portion 27, is upwardly bent in order to clear the end of the intermediate shingle and the tip portion is bent horizontally as indicated at 29, and extends over and clamps the latter in position.

It will be apparent that in this construction, suitable holes are formed in the intermediate portion 27, of the clip or clamp 26, for the reception of a nail, screw, bolt, or other fastening device 31, which extends into or through the purlin 11. The fastening is completely covered by the lower corner of the upper shingle.

It will be apparent that in this form of the invention, only a single hole is required for each shingle unit. The nail, or other fastening device extending through this hole is sufficient positively to prevent downward displacement of the shingle unit. The wings 29, of the clamps positively secure the intermediate corners of each unit from upward displacement, and therefore, prevent the possibility of any excessive backward bending of the shingle plates which might result in breakage thereof at the upper corners. The bow 27, in the clamp 26, provides a certain amount of resiliency or spring which prevents the likelihood of an excessive exertion of pressure upon the bottom shingle.

Figure 7:
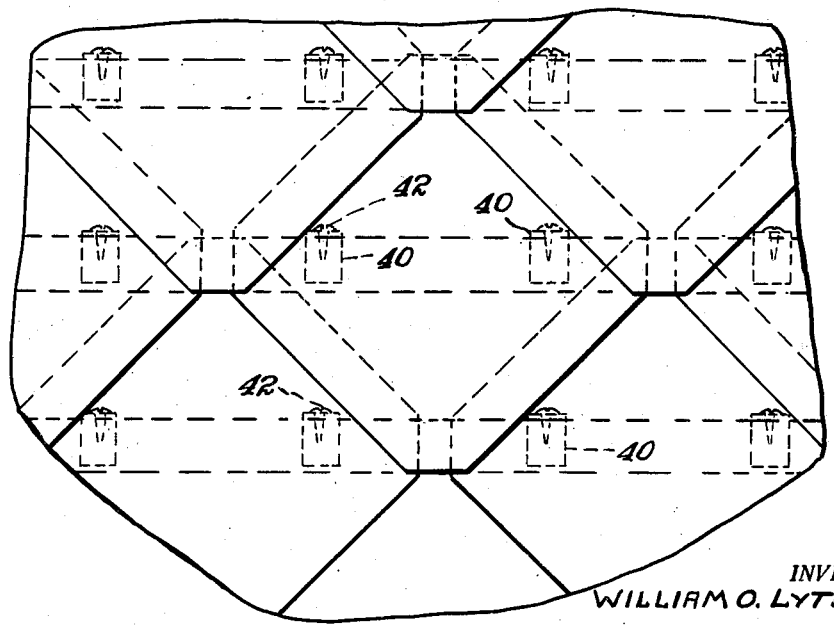
Figure 8:
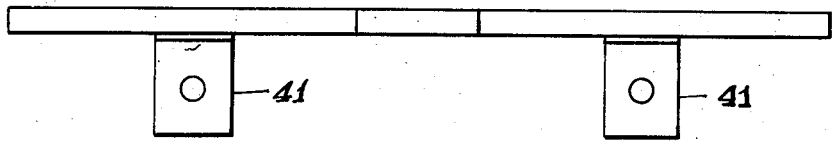
Fig. 8 is an elevational or edge view of one of the units disclosed in Fig. 7.

A further method of securing the plates or units would involve the provision of metallic tabs upon the under surface thereof. A construction of this type is shown in Figs. 7 and 8, in which one or more tabs 40 of sheet or strap metal are secured to the under surface of the glass and bent downwardly to provide lugs 41 which may be secured by nails 42 to the sides of the purlins. These tabs may be secured to the glass by soldering, e. g. by spraying the tempered glass while at a temperature of three or four hundred degrees C. with molten tin or lead, and then soldering the tab to the resultant coating. Ends of rods may also be embedded in the glass while the latter still is in molten state, to provide fastening lugs or hooks.

Figure 9:
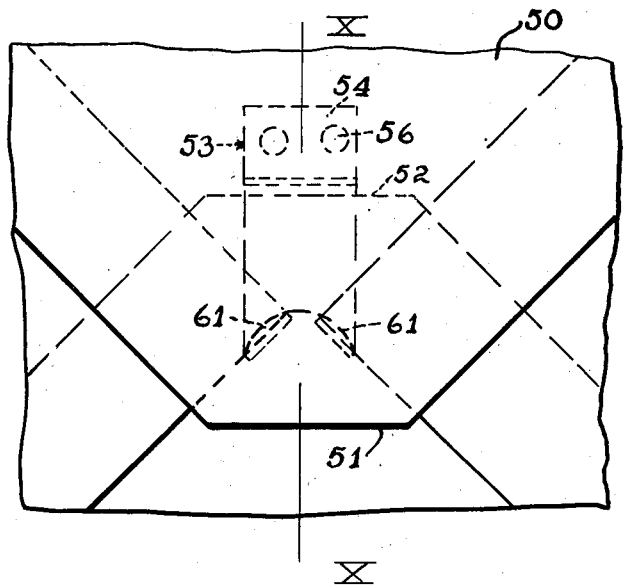
Figure 10:
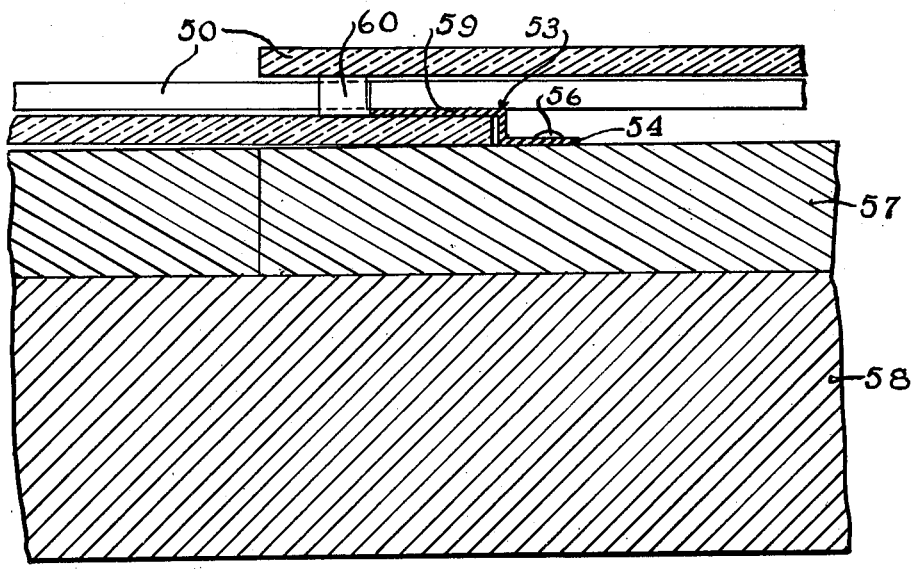
Fig. 10 is a fragmentary cross-sectional view upon the line X—X of Fig. 9

In the form of the invention illustrated in Figs. 9 and 10, shingle plates have their upper and lower corners cut away as indicated at 51 and 52. The transverse corners are square and are sandwiched between the lower corners of the shingles in the course immediately above and the upper corners of the shingles in the next lower course immediately below. The shingles are secured in position by means of clips or clamps 53, embodying an offset portion 54 which is secured by nails, screws or other securing devices 56 to the upper face of a deck 57, upon rafters 58. The portion 59 of the clip extends over the upper corner of the lower shingle and under the transverse corner of the immediate shingle. A pair of lugs 60 at the lower extremities of the portion 59 are bent upwardly about the lower edge of the intermediate shingle and are then bent over upon the upper surface of the latter to provide tabs 61, which operate to prevent upward displacement of the shingle engaged thereby.

It will be apparent that in this construction each shingle is gripped at both of its intermediate corners to prevent forward or upward displacement. At the same time the upper corner of each shingle is clamped by the portions 59 of the clip in such manner that rearward or upward tilting of the shingle plate is prevented. Therefore, substantial displacement of the shingles or plates in any direction is obviated. This form of securing device is of particular value where it is not desirable to form holes or openings in the plates of glass and where it is desired that all portions of the metal clamping devices be completely covered by the plates or shingles.

In the application of the invention illustrated in Fig. 11, the upper corners of the plates 65 are clipped to a substantial degree as indicated at 66. Preferably the lower and the transverse corners are retained intact. The transverse corners are disposed substantially above the edge of the cut away portion. The plates are laid in the manner already described with the transverse corners sandwiched between the upper and lower corners of the plates in the adjacent courses. The plates are secured to any convenient supporting structure or frame such as a deck, or to purlins or rafters by means of large headed nails 6, or similar pin-like fastenings. The latter are disposed in the angle formed between the lower edges of the plates in a course and the edges of the clipped portions 66 of the plates in the course below. Each plate is thus locked by nails preventing backward or forward or transverse movement and the heads of the nails overlapping the lower edges of the plates prevent the plates from being lifted away from the plane of the roof or wall. The nails are completely covered and at the same time the necessity of forming nail holes in the plates is obviated.

In Figs. 12 and 13 is shown a type of clip suitable for use in securing shingles or plates of the type shown in Fig. 11. This clip embodies a bar or strap 70 of iron, steel or other metal having an intermediate portion 71 and offset end portions 72 connected thereto by webs which extend obliquely across the bar at such angles as to approximate the angles of the lower edges of the plates, when they are assembled in a roof. The clips are secured to the supporting framework of a building by means of nails, screws, or rivets 74 extending through holes 76 in the portions 71.

When the clips are in position, the lower edge of the bar engages the edge of the cut away portion 66 and the portion 71 of the clip rests directly upon the underlying support. The end portions 72 overlap the transverse corners of the plates in the course and the webs 73 engage the lower edges of the same plates. The clips in a course thus positively lock the plates from displacement in any direction except rearwardly in the plane of the roof and displacement in the latter direction is prevented by engagement of the clips in the following course with the edge at 66.

It will be noted from Fig. 1 of the drawings that according to the present construction, the shingle units overlap each other only along their marginal portion, and that the major portion of the space covered by the plate is overlaid by a single thickness of glass. Such construction admits of the use of a minimum amount of glass which reduces expense of construction to a minimum. Furthermore, the relatively small amount of glass required, reduces the total weight on the roof and the building. The reduction of the amount of glass also insures the admission of a maximum amount of light to the building. The plates or shingles are practically impermeable or impervious to all moisture, and therefore, are not subject to disintegration caused by permeation and subsequent freezing of moisture in the grain of the material. Likewise, the shingles possess such strength and elasticity that rupture, due to freezing of water under the lower edges of the unit, is unlikely. However, in event that breakage does occur, from any cause whatever, it will be apparent that the broken unit immediately and automatically shatters into minute fragments which are practically harmless to any one struck thereby. The broken unit can instantly be recognized. Its replacement is extremely easy because it is so broken up that the pieces either fall out automatically, or can be picked out with a minimum of effort. After the unit has been removed, it is an easy matter to remove or to bend the clamp (assuming that clamps are used in securing the unit) or to cut out any nails which may have been employed in securing the old units, and then to slide a new unit into place. This is in sharp contrast to a unit composed of ordinary annealed glass which if broken, for example at the point "A" might readily leave a stub under the edges of the overlying shingles which could not readily be removed without considerable danger of breaking the whole shingle.

The transparency or translucency of glass shingles makes them particularly valuable for use in skylights and other structures designed to admit light. In these, the use of solid opaque backings or sheathings as supports for the units of glass is impracticable. However, in some constructions, transmission of light is not desired or is not required and the plates may then be mounted directly upon a solid disk. They may also be opaque if desired. The tendency of broken units of tempered glass to break into minute diced fragments is still quite important because the shingles are accessible only from above and under these conditions it would be particularly hard to break or chip out a stub of a broken unit from between the overlapping units. When a roof or wall is formed of tempered glass shingles upon a solid wooden deck, the stub is automatically shattered. It will be apparent that when a unit is removed a large area of the deck is exposed. It then becomes an easy matter to insert the upper edges of a new unit under the lower edges of the upper units. The lower corner of the new unit may be secured by a hook like that shown in Fig. 5, but nailed flat upon the deck. This can easily be done when the deck is exposed.

It will be understood that the edges of the cracks under the edges of the shingles can be filled with a caulking or sealing material, in order to preclude the possibility of entrance of water. However, with a roof having a reasonable degree of slope, the use of such material is not required.

Although only the preferred forms of the invention has been herein shown, and described, it will be apparent to those skilled in the art, that these are to be considered merely as exemplary, and numerous modifications may be made therein without departure from the spirit of the invention, or the scope of the appended claims.

What I claim is:

1. A building construction comprising longitudinal spaced bars and transverse spaced bars mounted thereupon, a covering secured directly upon the latter bars comprising light transmitting plates of tempered glass approximately of diamond shape, the plates being arranged in courses with one diagonal of each plate of each course approximately coinciding with a transverse bar, the plates being of such dimensions that the remaining corners rest upon the adjacent transverse bars, the upper edges of each plate being overlapped by the lower edges of the plates in the next succeeding course whereby to provide a roof in which the major portion of each plate is free of overlap and underlap by the adjacent plates.

2. A building construction as defined in claim 1 in which the plates are pierced by holes at least equal in diameter to the thickness of the plates and are secured to the transverse bars by means extending through the holes.

3. A shingle of tempered glass having a round opening therein of a diameter at least equal to the thickness of the glass.

4. A roof for a building comprising singles of tempered glass disposed in overlapping relation and secured to the framework of the building by fastening devices extending through round openings formed in the glass, the openings being of diameters at least equal to the thickness of the glass.

5. A building construction comprising imperforate light transmitting plates of tempered glass approximately of diamond shape, the plates being arranged in overlapping shingle-like courses upon a supporting structure, with two diagonally-opposed corners of each plate disposed transversely, and being sandwiched between the lower corner of the adjacent plates in the course above and the upper corner of the adjacent plates in the course below, a clamping device secured to the supporting structure above the upper corner of each plate and having a portion overlapping the upper portion of said plate, and having portions hooking over the lower edges of each of the two adjacent plates in the course above.

WILLIAM O. LYTLE.